United States Patent [19]

Hekman

[11] Patent Number: 4,860,419
[45] Date of Patent: Aug. 29, 1989

[54] SPLIT BEARING ASSEMBLIES, METHOD FOR MAKING

[75] Inventor: Frederick A. Hekman, Grosse Pointe Woods, Mich.

[73] Assignee: General Motors Corporation, Detroit, Mich.

[21] Appl. No.: 214,802

[22] Filed: Jul. 1, 1988

Related U.S. Application Data

[63] Continuation of Ser. No. 85,687, Aug. 17, 1987, abandoned.

[51] Int. Cl.⁴ .............................................. B23P 15/10
[52] U.S. Cl. ........................... 29/156.5 A; 29/149.5 R; 29/149.5 C; 29/413
[58] Field of Search ................... 29/149.5 R, 149.5 C, 29/156.5 A, 413, 416; 74/579 E

[56] References Cited

U.S. PATENT DOCUMENTS 2,703,263  3/1955  Zernov .
3,285,098  11/1966 Beveridge .
3,818,577  6/1974  Bailey et al. .
3,994,054  11/1976 Cuddon-Fletcher, deceased et al. .
4,569,109  2/1986  Fetouh .

Primary Examiner—Joseph M. Gorski
Attorney, Agent, or Firm—Robert J. Outland

[57] ABSTRACT

Method for making split bearing assemblies by fracture separation, particularly pertaining to engine connecting rods, include steps wherein previously clamped body and cap portions are quickly forced apart longitudinally to cause fracture separation of both pairs of integral legs in a single motion while the cap and body are restrained from substantial relative rotation by a clamp of a fracture separation apparatus.

8 Claims, 2 Drawing Sheets

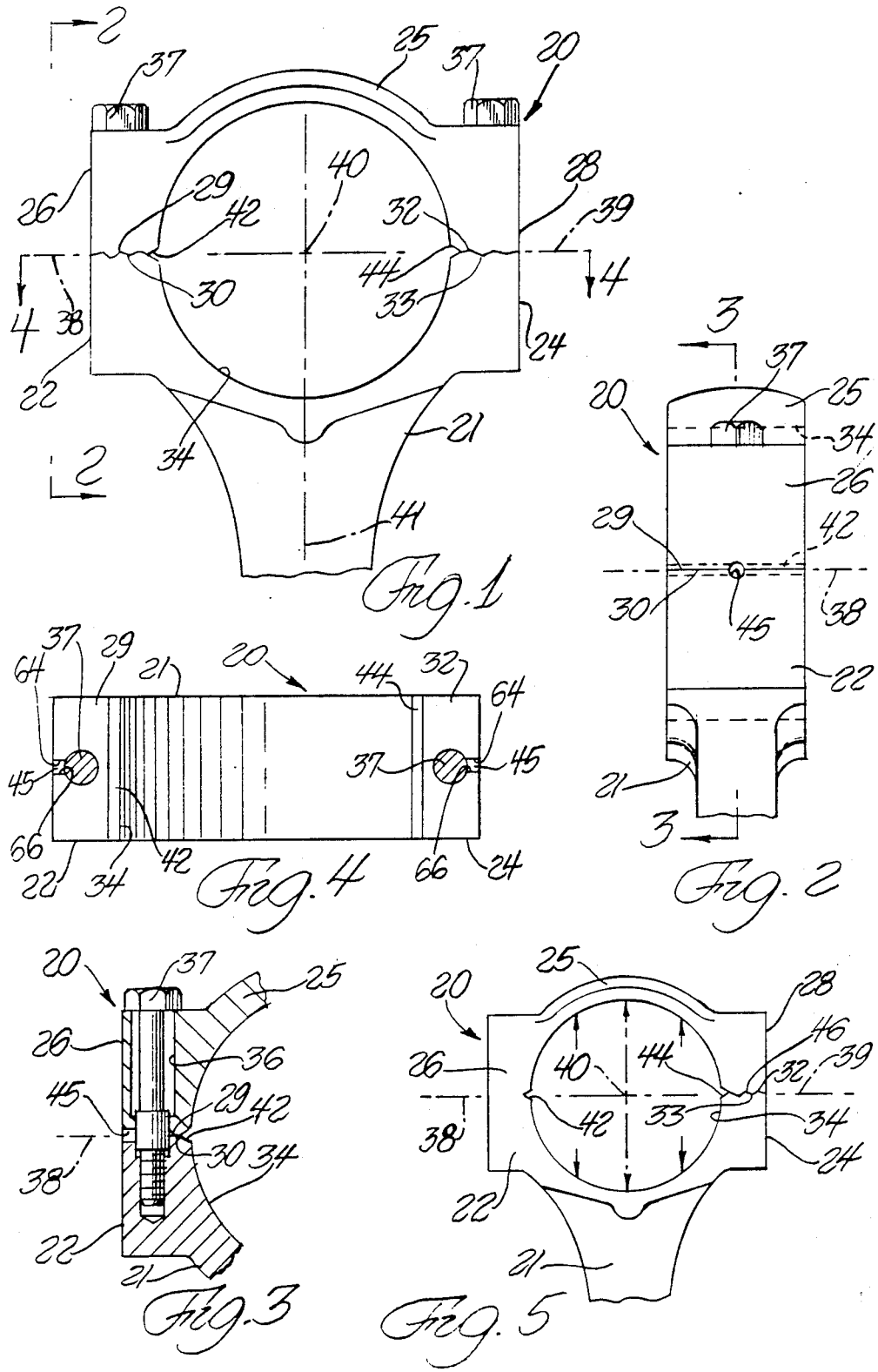

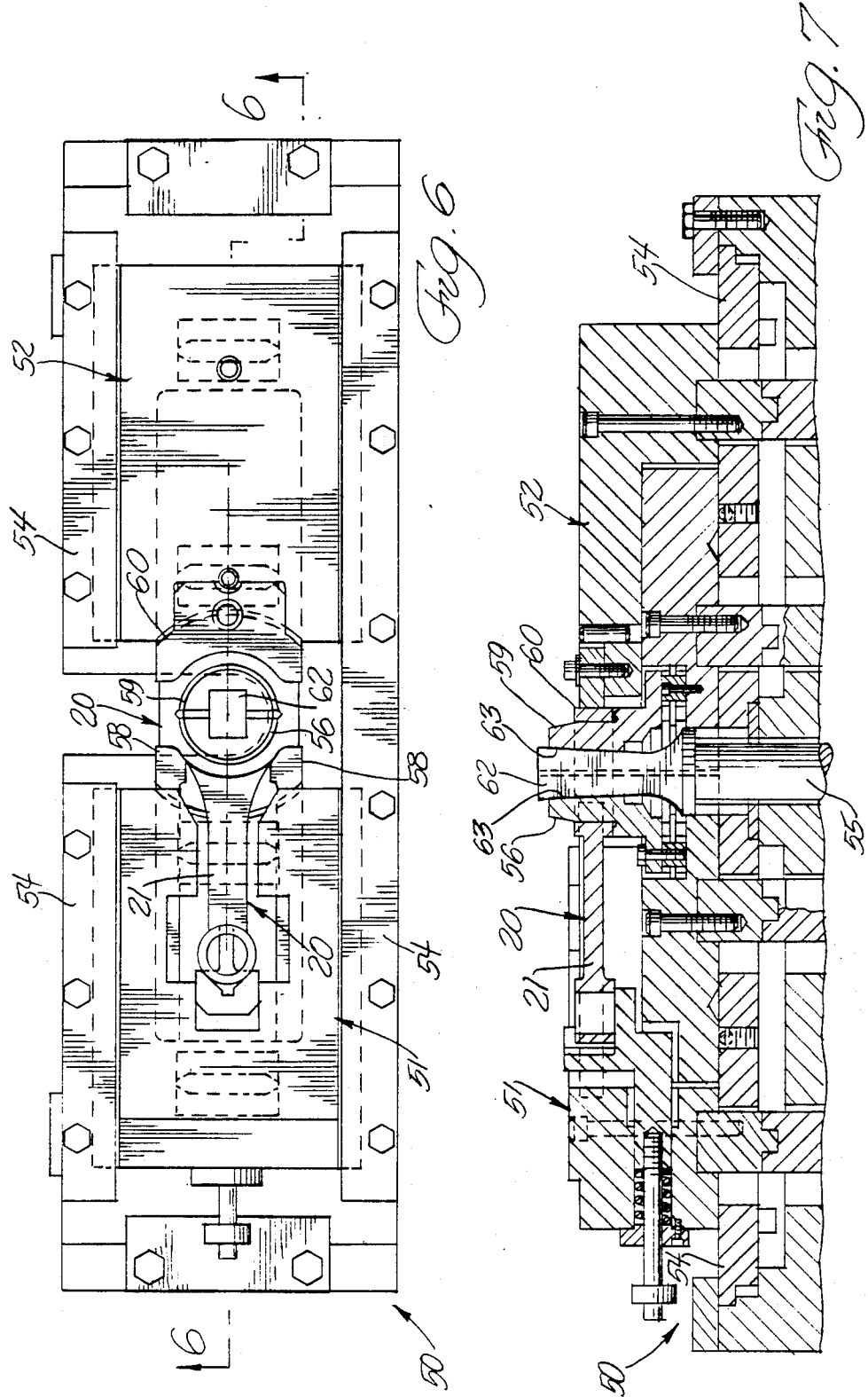

SPLIT BEARING ASSEMBLIES, METHOD FOR MAKING

CROSS REFERENCE

This is a continuation of U.S. patent application Ser. No. 085,687, filed Aug. 17, 1987, now abandoned.

TECHNICAL FIELD

This invention relates to methods for making split bearing assemblies of the type comprising a main body and a separable cap which are secured together to define a journal encircling bearing, or bearing receiving opening, for supporting a journal of a rotatable shaft, or the like. More particularly, the invention relates fracture separation methods for making split bearing assemblies of the type described.

BACKGROUND

U.S. Pat. No. 4,569,109 Fetouh, assigned to the assignee of the present invention, extensively describes prior methods of making split bearing assemblies for various uses. Examples of such uses are for engine crankshaft main and connecting rod bearing assemblies, camshaft bearing assemblies, crank-supporting bearing assemblies for compressors, presses and other machines, and other rotatable shaft-supporting bearing assemblies, in all of which a removable saddle-like bearing cap is secured to a mating saddle-like main body to provide for the installation and removal of a rotatable shaft, an attached connecting rod, or another device.

U.S. Pat. No. 4,569,109 further refers to prior methods of forming the main body and cap as integral members and completely machining all necessary surfaces, including the journal encircling opening or bore, before separating the main body and cap members techniques which involve fracturing the components along predetermined fracture planes, leaving interlocking rough surfaces that are capable of being re-engaged for assembly of the components into an operating assembly.

The prior art fracture techniques are said to include various methods of weakening the separation planes, such as by drilling holes therein and/or providing weakening notches along one or more edges. Embrittlement of the material in the separating planes may also be provided for either by material selection, heat treatment (including hardening of various types), or by freezing the material to reduce its temperature below the embrittlement point.

Further, U.S. Pat. No. 4,569,109 suggests that the various types of prior fracture techniques introduce various problems, among which are reduction of the engageable surface area of the separated parts that reduces the allowable clamping load and, in some cases, the introduction of excessive bending of the separating parts which results in yielding deformation of metal along the edges that interferes with proper reassembly of the separated components. Deformation of the previously machined opening can also be a problem with some methods.

U.S. Pat. No. 4,569,109 proposes a two step fracture separation method which avoids deformation of the fractured material at the edge of the last-broken legs of the bearing assembly. This method includes, first, fracturing one of the pairs of integrally formed legs and, then, restraining the fractured legs from moving substantially away from their mated positions, by clamping or the like, while fracturing the other pair of integrally formed legs. The fracture steps are accomplished in each instance by placing the split planes in tension, such as by applying a separating force in the bore between the cap and body.

SUMMARY OF THE INVENTION

The present invention utilizes the basic principles of the fracture separation methods developed by Fetouh but applies them in a manner and/or with certain modifications not specifically addressed in his U.S. Pat. No. 4,569,109. Like that of U.S. Pat. No. 4,569,109, the present method relies upon preforming of an integral bearing assembly, such as a connecting rod which may be completely machined and is made sufficiently brittle, and performing fracture separation while preventing substantial rotation of the cap relative to the body during separation of the second to be fractured pair of legs. Also, the method is believed to inherently follow the steps taught by U.S. Pat. No. 4,569,109 of, first, fracturing one of the integral pairs of legs by causing tension across the split plane and, second, clamping the partially separated cap and body portions to prevent substantial rotation of the cap relative to the body while fracture separation of the second pair of legs is carried out by causing tension on its split plane.

The present method provides certain steps or procedures for carrying out the method of U.S. Pat. No. 4,569,109 which are not specifically suggested or pointed out therein. Thus, in the present method, the integral cap and body are (1) clamped in separable antirotation clamp means that limit the relative motion of the cap and body to linear separating motion and (2) the integral pairs of legs are fractured by, preferably sharply, moving the cap and body clamp means linearly apart while preventing their relative rotation, thereby tensioning both pairs of integral legs across their split lines and causing fracture separation of both pairs of legs in the same motion.

While the present method differs in detail from the procedures specifically pointed out in U.S. Pat. No. 4,569,109, it is, nevertheless, submitted that this method inherently carries out the steps prescribed in that patent. Even though the fracture step takes place in one motion in which tensile forces are applied to both pairs of legs, it is inherent that one of the pairs of legs will crack first. After this, the clamped condition of the cap and body to prevent their relative rotation will maintain the fractured legs in essentially their mated positions until, a fraction of a second later, the second pair of legs is fractured and the cap is physically separated from the body.

Apparatus developed for carrying out the fracture process as herein set forth is described and claimed in copending U.S. Pat. No. 4,768,694 assigned to the assignee of the present invention.

In developing the present method for the manufacture of engine connecting rods, it has been preferred to make the integral workpieces by forging and to use starting notches in the bores at the split planes to initiate the fractures as is taught in U.S. Pat. No. 4,569,109. Embrittlement of the workpieces in a cryogenic liquid nitrogen bath prior to fracture separation has also been included in the method.

Additionally, however, it has been found preferable to make the workpieces from material having a fine grain size and homogeneous microstructure as this reduces the possibility of flaking and provides cleaner breaks at the fracture planes. This may be accomplished in the initial selection of materials and aided by heat treatment if required.

Also, it is preferred, when using steel forgings premachined with threaded cap screw or bolt openings, to provide small breakout openings drilled into the screw or bolt openings at the split planes on the outer sides, opposite to the starter notches in the bore. This provides a terminating line for each fracture as it proceeds from the starter notch around both sides of the screw or bolt opening to the breakout opening. It thus prevents the occurrence of a jagged edge where the two sides of the fracture meet at what may be slightly differing levels without the controlling action of the breakout opening.

The various features and advantages of the method will be more completely understood from the following description taken together with the accompanying drawings.

BRIEF DRAWING DESCRIPTION

In the drawings:

FIG. 1 is a plan view of the crankpin-encircling end of a connecting rod, forming a split bearing assembly in accordance with the invention;

FIG. 2 is a side view of the connecting rod portion of FIG. 1;

FIG. 3 is a fragmentary transverse cross-sectional view from the plane indicated by the line 3—3 of FIG. 2 showing the cap securing means and breakout openings;

FIG. 4 is a cross-sectional view of the assembly at the fracture planes as indicated by the line 4—4 of FIG. 1

FIG. 5 is a fragmentary plan view showing the partial fracture separation of a connecting rod which momentarily occurs during the fracture separation process;

FIG. 6 is a plan view of a connecting rod workpiece clamped in apparatus for conducting fracture separation of the cap and body by the method of this invention, and FIG. 7 is a longitudinal cross-sectional view of the apparatus from the plane of the line 6—6 of FIG. 5.

DETAILED DESCRIPTION

FIGS. 1-4 of the drawings illustrate the crankpin-encircling large end of a connecting rod assembly generally indicated by numeral 20 and of the type for use in internal combustion engines and the like. Connecting rod 20 includes a saddle-like main body 21 which is bifurcated to form first and second legs 22, 24 respectively and a removable saddle-like bearing cap 25 that is also bifurcated to define first and second legs 26, 28, respectively. The first legs 22, 26 of the body and cap have mating ends 29, 30 respectively and the second legs 24, 28 of the body and cap have mating ends 32, 33 respectively.

The mating ends 29, 30 and 32, 33 are secured in end-to-end engagement so that the saddle-like members 21, 25 define a journal receiving opening 34 in which a crankpin journal, not shown, may be received. Commonly, split insert bearing shells, not shown, are clamped within the journal receiving opening 34 to provide a suitable bearing surface for relative rotation of the crankpin, not shown, within the connecting rod.

As shown, the bifurcated legs 22, 24, 26, 28 of the body and cap incorporate integral bolt bosses through which bolt openings 36 extend from the distal ends of the cap legs 26, 28 through the mating ends 29, 30, 32, 33 and into the legs 22, 24 of the body to receive body bolts 37 that threadably engage the legs 22, 24 of the body and secure the legs 26, 28 of the cap in engagement therewith. Alternatively, unthreaded through openings receiving conventional bolts and nuts could be used to secure the cap legs to the body.

The mating ends 29, 30 and 32, 33 of the legs of the cap and body are comprised of rough, uneven mating surfaces formed by the fracture separation methods to be subsequently described and lying generally along split planes 38, 39 located on opposite sides of the opening 34. In the present instance the split planes lie on a common transverse diametral plane passing through the axis 40 of the pin encircling opening 34 and at right angles to the main longitudinal axis 41 of the connecting rod. It would be possible, however, to form the split planes 38, 39 outside of, or at angles to, the diametral plane.

At the inner edges of the mating ends, along the split planes 38, 39, notches 42, 44 are formed in the periphery of and extending longitudinally for the length of the cylindrical opening 34 to initiate and locate the starting points of separation in the subsequent fracture steps and form the inner edges of the mating legs of the cap and body. In the outer portions of the mating legs, breakout holes 45 are drilled or otherwise formed normal to and intersecting the bolt or cap screw openings 36 in the split planes 38, 39 and centered on the sides of the legs opposite the starter notches 42, 44. The cap may be formed of any suitable material such as cast iron, steel or aluminum, however forged steel is presently preferred as will be subsequently more fully discussed.

The steps in a preferred form of method, according to the invention, for manufacturing the connecting rod assembly of FIGS. 1-4 are as follows:

An integral unfinished connecting rod 20, including unseparated body and cap portions, 21, 25, respectively, with a pin-encircling opening defined thereby, is first formed in any suitable manner, such as, by casting, forging or the like.

The integral rod is then machined to essentially its finished dimensions by machining the bore 34 (preferably leaving a small amount of material for final machining after fracture separation), drilling and threading the bolt openings 36 and, if needed, breakout holes 45 and finishing the opposite sides of the connecting rod at the ends of the bore 34, if desired. Preferably, notches 42, 44 are also machined (or otherwise formed such as by casting or forging) extending longitudinally along the opposite lateral sides of the bore 34.

Following machining, preparation is made for separating the bearing cap 25 from the main body 21. For this purpose, the material, at least that in the split planes 38 and 39, must be sufficiently brittle. If the material of the connecting rod is inherently brittle, such as cast iron and some aluminum alloys, no additional preparation may be required. Less brittle materials, such as steel, may require selective hardening by any suitable process to embrittle the material sufficiently along the split planes to avoid excessive yielding when fractured.

As a third alternative, ductile or insufficiently brittle materials may be made temporarily brittle for processing purposes by reducing the temperature to a sufficiently low level. This may be done, for example, by soaking the parts in liquid nitrogen until they approach the liquid temperature of −320° F. (or at least reach a temperature level of −150° F.) in preparation for the fracturing step. With forged steel materials, heat treatment to control grain size and homogeneity may also be appropriate.

When the material along the split planes is, or has been made, sufficiently brittle, force applying means are utilized to apply a separating force on opposite sides of the bore 34, acting outwardly in opposite directions parallel to the longitudinal axis 41 of the connecting rod, as shown by the arrows in FIG. 5 of the drawings. The application of force in this manner causes tension across the split planes extending outwardly from the notches on opposite sides of the opening 34. The tension causes a crack 46 to progress from the edge of either one of the notches, in this case 44, generally along its normal split plane 39 to the outer edge of the connecting rod integral legs, terminating on the sides 64, 66 of the breakout opening 45, if provided, and causing fracture separation of the associated pair of the mating legs, in this case 24 and 28, while forming their mating ends as previously described.

After cracking of the one pair of legs, continued force application along the connecting rod longitudinal axis, causing further expansion of the opening 34, would cause the formation of a second crack along the split plane 38, on the opposite side of the connecting rod and result in fully separating the cap and main body. However, experience has shown that completing the fracture in this manner without additional controls may, through relative rotation of the cap and body, cause excessive bending of the material at the outer edges of the mating legs defined by the second crack. This bending may result in deformation or uncontrolled multiple fractures of the material along the outer edge which can interfere with proper mating engagement of the cap and main body upon attempted reassembly of the two members. Thus, it is advisable to provide means to prevent excessive opening of a space in the crack 46 which would allow the development of bending stresses in the material at the outer edge of the opposite split plane.

This may be accomplished by the method of the present invention carried out by suitable means as are shown in FIGS. 6 and 7. The integral connecting rod workpiece 20 is secured within a fixture generally indicated by numeral 50. The fixture 50 includes a body clamp assembly 51 and a cap clamp assembly 52 relatively movable along longitudinally aligned ways 54 in linear separating and approaching motions. A fracture ram 55 is arranged to provide rapid separation of the two clamp assemblies.

The body clamp assembly 51 includes a semi-circular pilot 56 which engages the body half of the journal opening 34 and a pair of body clamp elements 58 that, when actuated, engage the legs 22, 24 of the body and clamp the body nonrotatably against its pilot 56. Similarly, the cap clamp assembly 52 includes a semi-circular pilot 59 which engages the cap half of the journal opening 34 and a cap clamp element 60 that, when actuated, engages the legs 26, 28 of the cap and clamps the cap nonrotatably against its pilot 59.

The fracture ram 55 includes a wedge 62 that when drawn downward by an impact mechanism, not shown, acts against angled sides 63 of recesses in the pilots 56, 59 and forces apart the pilots and their associated clamp assemblies. This quickly separates the cap linearly from the body by causing tension at the split planes 38, 39 between the pairs of integral legs 22, 26 and 24, 28 until they fracture as described previously and in U.S. Pat. No. 4,569,109.

Even though the fracture process is accomplished in a single motion of the fracture apparatus, the method inherently results in one of the pairs of legs being the first to fracture. Thereafter, the clamping means, by preventing relative rotation of the cap and body in requiring their separation to be essentially linear, maintain the first fractured legs in essentially their mated positions until the fracture of the second pair of legs is accomplished. This may only take a fraction of a second. The separation of the completely fractured parts then continues until the separating step is complete.

In carrying out the fracture process, it should be recognized that the clamping step may be accomplished in other ways than by applying a clamping force on the ends of the separated legs as described in the specification. Accordingly, any method whereby the legs of the first separated pair are maintained essentially in their mated positions is to be considered as falling within the term "clamping".

In accordance with the present invention, it has been found that when forged steel workpieces are used, as is presently preferred, material selected and treated to have a homogeneous fine grain structure is preferred. This reduces the possibility of flaking and provides cleaner breaks at the fracture planes.

Also, it is preferred, when using forged steel workpieces provided with screw or bolt openings, to provide the small breakout openings 45 drilled into the screw or bolt openings 36 at the split planes on their outer sides, opposite to the starter notches 42, 44 in the journal opening 34. The breakout openings 45 provide terminating lines for the fractures as they proceed from the starter notches 42, 44 around both sides of the screw openings 36 to the breakout openings 45. They thus prevent the occurrence of jagged edges where the two sides of the fractures meet at what may be slightly differing levels without the controlling action of the breakout openings.

While the invention has been disclosed by reference to certain preferred methods and embodiments chosen for purposes of illustration, it should be understood that numerous changes could be made within the spirit and scope of the inventive concepts described. Accordingly it is intended that the invention not be limited to the described methods, but that it have the full scope permitted by the language of the following claims.

The embodiments of the invention in which an exclusive property or privilege is claimed are defined as follows:

1. A method of making a split bearing assembly having a saddle-like main body with first and second legs and a removable saddle-like bearing cap with first and second legs having ends respectively secured in end-to-end engagement with mating ends of the first and second legs of said body to define a journal receiving opening, said method comprising the steps of:

initially forming the bearing assembly body and cap integral with their mating leg ends integrally joined, said integral body and cap being in a relatively brittle condition, at least along generally predetermined split planes defining the leg ends on opposite sides of said opening, said body and cap having essentially their assembled final dimensions, with said opening being centered on an axis lying within said main body and said cap, generally between said split planes, and separating the cap from the main body by fracturing the integral legs generally along said split planes on opposite sides of said opening to form said legs of the saddle-like cap and body, said first and second legs of the cap and body comprising respectively first and second pairs mateable along said split planes, wherein the fracturing step is accomplished by forcing the cap and main body linearly and longitudinally apart while continuously applying a damping force to said cap and main body, thereby restraining said cap and main body against any substantial relative rotation, thereby fracturing and separating the ends of both said pairs of integral legs at their respective split planes in one essentially linear separating motion of the cap from the main body, thereby avoiding bending of the legs at the split planes and producing mating fracture surfaces on engaging legs edges to provide the capability of mating reassembly without substantial dimensional change.

2. A method of making a split bearing assembly having a saddle-like main body with first and second legs and a removable saddle-like bearing cap with first and second legs having ends respectively secured in end-to-end engagement with mating ends of the first and second legs of said body to define a journal receiving opening, said method comprising the steps of:

initially forming the bearing assembly body and cap integral with their mating leg ends integrally joined, sad integral body and cap being in a relatively brittle condition, at least along generally predetermined split planes defining the leg ends on opposite sides of said opening, said opening being centered on an axis lying within said main body and said cap, generally between said split planes, and separating the cap from the main body by fracturing the integral legs generally along said split planes on opposite sides of said opening to form said legs of the saddle-like cap and body, said first and second legs of the cap and body comprising respectively first and second pairs mateable along said split planes, wherein the fracturing step is accomplished by forcing the cap and main body linearly and longitudinally apart while continuously applying a clamping force to said cap and main body, thereby restraining said cap and main body against any substantial relative rotation, thereby fracturing and separating the ends of both said pairs of integral legs at their respective split planes in one essentially linear separating motion of the cap from the main body, thereby avoiding bending of the legs at the split planes and producing mating fracture surfaces on engaging legs edges to provide the capability of mating reassembly without substantial dimensional change.

3. A method according to claim 2 wherein said step of forcing the cap and main body linearly and longitudinally apart is accomplished by applying separating forces to the body and cap in directions normal to a plane joining the split planes of the two pairs of legs, said forces being applied to opposite sides of said opening, between the legs of the body and of the cap.

4. A method according to claim 3 and further comprising
providing longitudinal notches across inner edges of the split planes on opposite sides of the opening prior to fracturing to initiate the fracture and positively locate inner edges of the separated leg ends.

5. A method according to claim 2 and further comprising
providing the integral legs with fastener openings extending from the cap into the body on opposite sides of the bore, and
providing breakout holes extending outward along the split lines from the fastener openings through outer edges of the integral legs to establish predetermined termination locations for the subsequent fractures.

6. A method according to claim 2 and further comprising
providing longitudinal notches across inner edges of the split planes on opposite sides of the opening prior to fracturing to initiate the fractures and positively located inner edges of the separated leg ends.

7. A method according to claim 6 and further comprising
providing the integral legs with fastener openings extending from the cap into the body on opposite sides of the bore, and
providing breakout holes extending outward along the split lines from the fastener openings through outer edges of the integral legs to establish predetermined termination locations for the subsequent fractures.

8. A method according to claim 2 wherein said split bearing assembly comprises a connecting rod.

* * * * *